2,926,121

THERAPEUTIC CANDY-LIKE PRODUCT AND ITS PREPARATION

Norman L. Hobbs, Rosemont, and Anthony L. Monaco, Norristown, Pa., assignors to American Home Products Corporation, New York, N.Y., a corporation of Delaware No Drawing. Application March 20, 1957
Serial No. 647,214

6 Claims. (Cl. 167—82)

This invention relates to a new and improved therapeutic dosage form containing an alkalizing agent wherein, because of the retainment of the antacid within the matrix of a fully hydrated colloid structure, the chemical reactivity of the alkalizing agent is substantially unimpaired.

More particularly, our invention relates to a novel dosage form which contains alumina gel as the antacid, and wherein the alumina gel is in the fully hydrated form and is so protected in a gel matrix that its reactivity rate and acid-consuming capacity are substantially unimpaired.

Our invention relates also to the method by which these new therapeutic dosage forms may be prepared.

In the management of stomach ulcers, and in the treatment of various other disorders and conditions, a usual mode of treatment is to have the patient ingest alkaline agents which are effective in reducing stomach acidity and for other purposes. Among alkaline preparations employed extensively in medicine, fully hydrated aluminum hydroxide $Al_2(OH)_6$, which has high acid-consuming capacity and is rapid in its action, has been used with marked success.

While fully hydrated aluminum hydroxide, known in medicine as alumina gel or fully hydrated alumina gel, is very satisfactory for the management of stomach ulcers, physicians have frequently considered the advantages of being able to administer it in some form other than as the thick, unappetizing astringent suspension which is its usual pharmaceutical form. One of these alternative forms, which would be desirable in that the product could be made both pleasant in taste and attractive in appearance, would be administration of the alumina gel in the form of a sweetened gel or gum. If available as a sweetened gel or gum, but in form equally satisfactory to the present suspension as an antacid, alumina gel would have wider acceptance by physicians and patients than it now enjoys.

However, previously, when attempts were made to incorporate alumina gel with other usual candy-making ingredients, such, for example, as sucrose and sorbitol, the result was entirely unsatisfactory in that the gel structure of the aluminum hydroxide completely collapsed and the sugar caramelized. The resulting product was both unsatisfactory as a candy and ineffective as a pharmaceutical antacid product. Not only was a solid candy not obtained, but the reactivity of the alumina gel was destroyed. Both its acid-consuming capacity as well as the speed with which it reacts with acid were greatly reduced.

Normal candy-making procedure cannot be employed; namely, heating to drive off excess water and further removal by use of vacuum, as this results in caramelization of the sugars because of the presence of the alkalizing agent. It has been found necessary to use the highest equivalent $Al_2O_3$ content material in order to have the water content the lowest, and then, by proper sequence of addition of materials, to: (1) release the bound water; (2) use this water to dissolve the sugars; (3) to further this water pickup by adding the colloidal material; and (4) after complete hydration or gelling of the colloid material to lose further water by air drying or by casting into starch molds, this last step being common to normal candy-making. After the proper drying it is normal to use sanding sugar on the exterior for ease of handling.

Since loss of chemical reactivity of the alumina gel is directly related to loss of moisture, and since liquefication and reduction in the degree of hydration of the aluminum hydroxide always resulted from previous attempts to incorporate it in a candy-like base, it was the opinion of experts in this field that alumina gel could not be incorporated therein under circumstances wherein its activity would be preserved and a solid, commercially satisfactory form produced.

We have now found that by the use of various gel forming materials, substantially gelatin, or starch; by employing alumina gel of very high equivalent $Al_2O_3$ content in the fully hydrated form; and by utilizing a particular order in which the ingredients comprising the dosage form are combined; it is now possible to secure a very satisfactory product of elegant pharmaceutical form wherein neither the degree of hydration nor the chemical reactivity of the alumina gel has been reduced to any appreciable extent.

It is accordingly one of the objects of our invention to provide a product containing a fully hydrated alumina gel wherein the structure is commercially satisfactory and attractive, and the alumina gel is present with its degree of hydration substantially unimpaired, so that neither its acid-consuming capacity, nor the speed with which it neutralizes acid, is appreciably reduced.

Another object of the invention is the preparation of a product containing alumina gel wherein dehydration of the alumina gel during the manufacturing process is avoided, this being accomplished by careful selection of the ingredients which are used in making the product, as well as by the careful control of the manufacturing process.

Still another object of our invention is the preservation of the activity of fully hydrated alumina gel in the semi-solid state by providing a form wherein a colloid material, such as gelatin or starch, provides a hydrated protective colloid layer around the aluminum hydroxide, thus preventing dehydration or loss of reactivity during manufacture or storage.

It is a further object of our invention to provide an improved product containing fully hydrated alumina gel wherein the astringency which is characteristic of liquid and tablet forms of this therapeutic antacid has been completely eliminated.

Among other related objects of our invention is the preparation of a product which will not caramelize or turn brown on storage.

These, as well as further objects of our invention, will be apparent from the disclosure which follows of certain preferred embodiments thereof.

In the preparation of our improved therapeutic product containing alumina gel of substantially unimpaired reactivity and acid-consuming ability, we have found it important to utilize a highly concentrated alumina gel. We have found, for example, that the usual alumina gel containing an equivalent of approximately 4.0 percent $Al_2O_3$ content is unsatisfactory, and that only a thin liquid mass results when an attempt is made to incorporate it with the other ingredients normally comprising the product. In order to get a satisfactory product, it is essential that a pasty or gelatinous mass result when the antacid is admixed with the other ingredients.

While it is important that the alumina gel incorporated be a liquid, we have found that the $Al_2O_3$ content thereof should be relatively high, so that, in fact, while still pourable, the alumina gel is in the form of a fairly thick suspension. For most purposes we prefer to utilize a 12 percent gel, i.e. one containing an equivalent of 12 percent of $Al_2O_3$ and a gel of this concentration is about as viscous as it is possible for it to get and still remain liquid to the extent that it can be poured, although with difficulty.

Whereas lower percentage gels are usable, it requires a greater quantity of material to arrive at the high level of acid-neutralizing capacity desired or, conversely, if lower gel strengths are employed (lower equivalent $Al_2O_3$ content) then it becomes necessary to use greater quantities of sugars and colloids to build up the body of the piece. It is also possible, of course, to use lower equivalent $Al_2O_3$ content gels and relatively the same proportions of materials further outlined if the excess water is removed by some mechanical means, vacuum, air drying, etc.

We have also found that the order of addition of the ingredients to produce the gelatinous or pastry mass which, after processing and drying, results in the dosage form is of considerable importance. Hot formulation methods wherein the candy mass is subjected to heating have been found unsatisfactory since they uniformly resulted in caramelization of the sugar.

In preparing the candy the sugar is first added to the aluminum hydroxide suspension. The latter, which is preferably in the form of a relatively thick, difficultly-pourable suspension of high equivalent $Al_2O_3$ content, is rendered more liquid by addition of the sugar so that a relatively thin, non-viscous suspension results.

At this stage of the process, the other ingredients were added to the pasty mass. These may include gelatin or starch, flavoring and coloring agents, other forms of sugar, such as dextrose, lactose, corn syrup, sorbitol, etc. and various preservatives such as alkali metal benzoates, and of the various parabens (i.e. the methyl, propyl and butyl parabens, all available commercially), as well as other ingredients. If, in addition to the aluminum hydroxide antacid, the product is to contain another antacid, such as magnesium hydroxide, magnesium trisilicate, calcium carbonate, etc., it is also added at this stage. Any of these additional antacid substances, which may be added either singly, or in various combinations, is preferably incorporated in the mass in dry powdery or granular form. It may be noted that, as distinguished from the alumina gel, the incorporation of any of these alkalizers presents no special problem, and they may, in fact, be added at any stage of the manufacturing process without difficulty.

The thick pasty or gelatinous mass resulting when all the necessary ingredients have been incorporated therein is preferably then strained to remove insoluble lumps. When preparing an alumina gel-containing candy of the marshmallow type in accordance with our invention, the mixture is thoroughly agitated under circumstances such that a fixed volume of air is allowed to enter the mass. While various types of apparatus may be used in this step when producing a final product of the marshmallow type, we have found the use of a Girdler Votator especially satisfactory for incorporating air into the mass. A Girdler "Votator" includes a rotating container with interior paddles, wherein the mixture is thoroughly mixed and aerated. Other means of incorporating air homogeneously throughout the mass can of course also be utilized. While it is possible at this stage to heat or to cool the mass to a slight degree without danger of breaking the gel structure, ordinarily we prefer merely to remove it from the aerating mechanism without further heating or cooling. Its moisture content is reduced to some extent during the agitation and air introduction step.

If a gumdrop type of product is desired, the material is not aerated but poured into wax-lined trays, placed in a drying room at 130° F. for 24 hours, then turned over and dried an additional 24 hours at 130° F. before cutting and sanding.

The product mass may then be spread out and cut to piece size. Alternatively it may be cast into molds or otherwise shaped to attractive commercial form. After being allowed to dry it is packaged in the desired commercial package or container.

The astringency which is somewhat characteristic of liquid forms of alumina gel is not characteristic of our improved product.

The resulting product is one in which the hydrated aluminum hydroxide gel, with little, if any, of its fully hydrated character destroyed, is protected by the fully hydrated protective colloid, i.e. either gelatin or starch, which surrounds the alumina gel and in which it is retained, as in a matrix. Since the degree of hydration of the alumina gel, sometimes expressed as $Al_2(OH)_6 \cdot XH_2O$ has not been changed, the reactivity and acid-consuming power of the antacid are unimpaired.

As previously noted, reduction in the moisture content of the gel would destroy the effectiveness of the material as an antacid to a degree equivalent to the extent of moisture loss. The activity of the active aluminum hydroxide gel has been preserved in the semi-solid state by the expedient of protecting it, in the substantially undehydrated form, by a surrounding hydrated protective colloid. The most alkaline (High pH) type gel is beneficial to maintain highest acid neutralizing power.

Expressed another way, the water requirements necessary to maintain the alumina gel in the fully hydrated condition and of unimpaired activity in our product are met by the water retaining properties of the colloidal material, i.e. the water retaining properties of the gelatin or starch. Gelatin, for example, can carry up to about 10 percent of water and still remain in the solid state. A humectant such as sorbitol or glycerin may have to be added.

As previously explained, the order in which the process steps are carried out is important, and it is important to add the colloid material (gelatin or starch) along with the other ingredients (flavor, preservatives, other antacids, etc.) only after the sugar has been added to the thick alumina gel of high equivalent $Al_2O_3$ content. Contrary to most candy-making operations in which the addition of sugar results in a thick pasty mass, the addition of sugar to the viscous alumina gel lowers the viscosity and results in a thinner or more pourable liquid, into which the colloid and other ingredients can be introduced without any difficulty whatever.

The following examples are illustrative of our invention.

Example 1

A marshmallow-type candy was prepared from the following ingredients by the cold formulation process.

| | Parts by weight |
|---|---|
| Aluminum hydroxide gel (12 percent $Al_2O_3$ concentration) | 340 |
| Sugar | 450 |
| Gelatin in the form of solid pellets (Bloom strength 160) | 22.5 |
| Water | 28 |
| Corn syrup | 425 |
| Flavoring agents | To taste |

The gelatin was first soaked in water.

To the thick alumina gel of 12 percent $Al_2O_3$ concentration, there was added the required amount of sugar. This resulted in a suspension of lowered viscosity. The gelatin, water, corn syrup and flavoring agents were then added. In accordance with the usual cold formulation candy-making procedure, the mixture was then placed in a Girdler Votator. The violent mixing therein resulted in the incorporation of a considerable quantity of air. At the conclusion of the mixing step, and when the mass was thoroughly homogeneous in character, it was removed from the Girdler Votator and cast into starch-dusted molds. After permitting the individual pieces to dry in the air, the resulting product, resembling marshmallow pieces, was packaged.

*Example 2*

Following the same process described in Example 1, a marshmallow type product was made up containing the following ingredients:

| | Parts by weight |
|---|---|
| Aluminum hydroxide gel | 368 |
| Sugar | 141 |
| Dry gelatin (Bloom strength 160) | 19 |
| Sodium benzoate (preservative) | 1 |
| Flavoring agents | To taste |

Prior to the incorporation of the gelatin, it was hydrated, as in Example 1, by allowing it to stand in water.

The resulting marshmallow type product was very palatable. It exhibited an acid-consuming ability equivalent to that exhibited by the contained amount of aluminum hydroxide, had this been ingested separately by the patient, and not consumed as a candy.

*Example 3*

A spongy type of product was prepared following the procedure described in Example 1 and utilizing the following ingredients:

| | | |
|---|---|---|
| Aluminum hydroxide gel (12 percent $Al_2O_3$ content) | grams | 476.28 |
| Sugar | do | 4536.6 |
| Dry granular gelatin | do | 22.68 |
| Anhydrous dextrose | do | 368.55 |
| Sodium benzoate | do | 1.0 |
| Methyl paraben | do | 0.09 |
| Propyl paraben | do | 0.01 |
| Oil of peppermint | ml | 0.05 |
| Vanillin solution | ml | 3.0 |
| F & D yellow color | ml | 2.5 |
| Magnesium hydroxide N.F. (powdered) | grams | 16.0 |

The process utilized was similar to that described in Example 1. As in that example, the sugar and anhydrous dextrose were first added to the alumina gel, resulting in a less viscous product, to which the gelatin and other ingredients were then added.

The preservatives, i.e. the sodium benzoate and the parabens, were incorporated in the mass prior to aeration. The flavoring agents, yellow color, and dry magnesium hydroxide were also added at this stage.

Sodium benzoate, and the methyl and propyl parabens, while efficient preservatives, may be replaced by other active agents. For example, any of the parabens, such as butyl paraben, or any other commercially available preservative, may be employed.

Working up the product mass included whipping and mixing to introduce air, followed by drying. The individual pieces were cut out of the dried sheet.

The resulting sponge-type product was palatable, devoid of astringent taste, and commercially attractive. The acid-consuming power and speed of reactivity of its aluminum hydroxide constituent had not been impaired in any way.

*Example 4*

A gumdrop type of candy was prepared from the following formula, which formula is typical of those suitable for this type of alumina gel-containing candy:

| | | |
|---|---|---|
| Aluminum hydroxide gel (12 percent $Al_2O_3$ concentration) | pounds | 72 |
| Sugar, fine | do | 65 |
| Sorbitol, anhydrous | do | 25 |
| Dextrose | do | 48 |
| Starch (Flo Gel 65) | do | 13 |
| Magnesium hydroxide—$Mg(OH)_2$ | pounds | 2.5 |
| Anti-foaming agent | grams | 2.2 |
| Propyl paraben | do | 8.6 |
| Methyl paraben | do | 77.4 |
| Oil of peppermint | cc | 15.0 |

The aluminum hydroxide wet gel and fine sugar were placed in a kettle and stirred until the wet gel liquified. Any non-toxic anti-foaming agent was then added, and the mixture heated to a temperature within the range 180–190° F. The dextrose and sorbitol were then added and the mixture stirred until they were dissolved. Next were added the magnesium hydroxide, starch, the parabens as preservative agents, and the oil of peppermint for flavor. The mixture was then cooked in a rotating container with interior paddles such as a Girdler "Votator" at a temperature of 282° F. under 75 pounds per square inch pressure. It was then cooled to a temperature within the range of 175–180° F.

Pieces of candy in final form were then prepared by casting the mixture into starch molds held at 90° F. for 48 hours before sanding with sanding sugar. Part of the material was poured into wax lined trays which were then placed in a drying room at 130° F. for 24 hours. The composition in the trays was then turned over, and the trays kept in the drying room for an additional period of 24 hours at 130° F. Pieces of candy were then cut out from the dried mass and sanded with sanding sugar.

The theoretical composition of each finished piece of candy was as follows:

| | Percent |
|---|---|
| Sanding sugar | 10.70 |
| Alumina gel | 3.84 |
| Sugar (fine granulated) | 28.86 |
| Sorbitol | 11.08 |
| Dextrose | 21.35 |
| Starch | 5.18 |
| Magnesium hydroxide | 1.11 |
| Water | 17.87 |
| Flavoring and preservatives | 0.01 |

Sanding sugar is used in the production of the final pieces of candy in order to form a dry exterior, thereby preventing sticking of the candy to the container. The sorbitol acts as a humectant, i.e. acts to hold moisture within the pieces of candy. The dextrose slows up the crystallization of the fine granulated sugar, while starch is used to form the gel-like matrix. Glycerin can also be used as a humectant, either along with sorbitol, or alone. Gelatin could be utilized in place of starch.

In the preparation of a gumdrop type of candy the ingredients are mixed in the Girdler "Votator" in a closed system wherein air is completely excluded. This is contrasted with the type of mixing when a marshmallow type candy is prepared wherein a fixed volume of air is allowed to enter the thoroughly comminuted mass.

The above description and examples are intended to be illustrative only. Modifications thereof, as well as variations therefrom, are intended to be included within the scope of the appended claims.

We claim:

1. A cold formulation process for the manufacture of therapeutic candy which comprises adding sugar to a highly concentrated aqueous suspension of aluminum hydroxide of substantially 12 percent $Al_2O_3$ concentration; adding to the resulting mixture a protective colloid in solid form selected from the group consisting of gelatin and starch; homogenizing the resulting mixture and introducing air thereto; and allowing the resulting pasty mass to dry at room temperature without the application of heat thereto.

2. The process of producing a therapeutic candy containing alumina gel as an antacid which comprises adding sugar to an aqueous solution of alumina gel of approximately 12 percent $Al_2O_3$ content, thereby producing a somewhat thinner and less viscous suspension; adding thereto a colloid selected from the group consisting of gelatin and starch; adding to the resulting pasty suspension flavoring agents, coloring agents and preservatives; homogenizing and aerating said paste until a substantial amount of air has been incorporated thereinto; and permitting said paste to dry at room temperature without the application of heat thereto.

3. The process of producing a therapeutic candy wherein alumina gel is retained in the candy matrix, said alumina gel being of substantially unimpaired reactivity and acid-consuming capacity, which comprises: adding sugar to a thick, difficultly-pourable suspension of hydrated aluminum hydroxide of substantially 12 percent $Al_2O_3$ concentration; adding, to the resulting relatively-thin, non-viscous suspension, gelatin in the form of individual solid particles which have been previously soaked in water; adding flavoring agents, preservatives and coloring agents to the resulting thick paste; aerating said paste, at the same time homogenizing the mixture, by subjecting said paste to vigorous agitation; and drying the resulting aerated paste-like mixture at room temperature.

4. The process defined in claim 3 wherein at least one additional antacid material selected from the group which consists of magnesium hydroxide, magnesium trisilicate and calcium carbonate is added to said relatively-thin, non-viscous suspension of sugar and hydrated aluminum hydroxide.

5. The process of producing a therapeutic candy containing an effective antacid by cold formulation which comprises carrying out the following steps at room temperature, without the application of heating at any stage of said process: adding sugar to a thick, difficultly-pourable aqueous suspension of hydrated aluminum hydroxide of an equivalent $Al_2O_3$ content of approximately 12 percent; adding dry granular gelatin to the resulting suspension; adding a preservative agent, a humectant, a coloring agent, and flavor to the resulting thick paste; introducing air into said paste; and drying said aerated paste in the air at room temperature to form the therapeutic candy product.

6. A cold formulation process for producing a therapeutic candy of gumdrop type wherein alumina gel of substantially unimpaired reactivity and acid-consuming capacity is retained in a candy matrix, said process being carried out without the application of heat except during the final drying stage, which comprises: adding sugar to a thick, difficultly-pourable suspension of aluminum hydroxide of substantially 12 percent $Al_2O_3$ concentration, the viscosity of said suspension being thereby reduced so that a relatively thin and less viscous mass results; adding dry granular gelatin as solid pellets to said less viscous mass resulting; adding preservative, coloring and flavoring agents, and a humectant to the resulting pasty mass; adding thereto additional sugar in the form of a sweetening agent selected from the group which consists of dextrose, lactose, corn syrup and sorbitol; straining the pasty mass resulting in order to remove insoluble lumps; homogenizing by thoroughly dispersing all constituents throughout said mass; pouring said mass into a wax-lined tray and drying it by heating it at substantially 130° F. for approximately 48 hours; spreading out said dried paste and cutting it to piece size; allowing said mass to dry still further at room temperature; and sanding the resulting dried pieces of therapeutic candy with sugar to prevent adherence together of said individual pieces.

References Cited in the file of this patent

UNITED STATES PATENTS

| | | |
|---|---|---|
| 1,949,266 | Bird | Feb. 27, 1934 |
| 2,472,476 | Hardt | June 7, 1949 |
| 2,774,710 | Thompson et al. | Dec. 18, 1956 |

OTHER REFERENCES

Richmond: "Candy Prod.—Methods and Formulas," The Manuf. Confec., Chicago, Ill., 1948, pp. 340, 358 and 359.

U.S. Disp., 25th ed., 1955, pp. 598–601, J. B. Lippincott Co., Philadelphia.

UNITED STATES PATENT OFFICE
CERTIFICATE OF CORRECTION

Patent No. 2,926,121        February 23, 1960

Norman L. Hobbs et al.

It is hereby certified that error appears in the printed specification of the above numbered patent requiring correction and that the said Letters Patent should read as corrected below.

Column 5, line 33, Example 3, in the table, opposite "Sugar" for "4536.6" read -- 453.6 --.

Signed and sealed this 6th day of September 1960.

(SEAL)
Attest:

ERNEST W. SWIDER
Attesting Officer

ROBERT C. WATSON
Commissioner of Patents